(12) United States Patent
Millsap et al.

(10) Patent No.: US 7,181,644 B2
(45) Date of Patent: Feb. 20, 2007

(54) METHOD FOR SYNCHRONIZING DATA UTILIZED IN REDUNDANT, CLOSED LOOP CONTROL SYSTEMS

(75) Inventors: Scott A. Millsap, Saginaw, MI (US); Sanket S. Amberkar, Ann Arbor, MI (US); Joseph G. A'Dmbrosio, Clarkson, MI (US)

(73) Assignee: Delphi Technologies, Inc., Troy, MI (US)

( * ) Notice: Subject to any disclaimer, the term of this patent is extended or adjusted under 35 U.S.C. 154(b) by 1084 days.

(21) Appl. No.: 10/043,930

(22) Filed: Jan. 11, 2002

(65) Prior Publication Data

US 2003/0133526 A1 Jul. 17, 2003

(51) Int. Cl.
  *G06F 11/00* (2006.01)
  *G06F 15/16* (2006.01)
  *G06F 13/42* (2006.01)
  *G05B 9/02* (2006.01)
  *H04J 3/06* (2006.01)
  *H04L 7/00* (2006.01)

(52) U.S. Cl. .......................... 714/11; 714/13; 714/17; 700/45; 700/82; 700/89; 713/375; 713/401; 713/500; 370/507; 375/356

(58) Field of Classification Search ............ 700/18–21, 700/44, 45, 79, 82, 89; 701/33–35; 709/200, 709/248; 370/503, 507, 509–514; 375/354–358; 340/825.2; 713/375, 400, 401, 500; 714/1–3, 714/10–13, 15–17
See application file for complete search history.

(56) References Cited

U.S. PATENT DOCUMENTS

| | | | | |
|---|---|---|---|---|
| 3,745,882 A | * | 7/1973 | Anderson ........................ 91/1 |
| 4,303,978 A | * | 12/1981 | Shaw et al. .................. 701/220 |
| 4,492,874 A | * | 1/1985 | Near ......................... 290/40 B |
| 4,771,427 A | | 9/1988 | Tulpule et al. .................. 371/8 |
| 4,774,709 A | | 9/1988 | Tulpule et al. ................. 371/11 |
| 5,274,554 A | * | 12/1993 | Takats et al. .................. 701/33 |
| 6,577,231 B2 | * | 6/2003 | Litwin et al. ................ 375/356 |
| 6,732,300 B1 | * | 5/2004 | Freydel ........................ 714/36 |
| 6,826,607 B1 | * | 11/2004 | Gelvin et al. ................ 709/224 |
| 6,853,920 B2 | * | 2/2005 | Hsiung et al. .................. 702/1 |
| 2005/0273182 A1 | * | 12/2005 | Pearce et al. ................. 700/20 |

OTHER PUBLICATIONS

EP Office Action for EP application 02 080 607.1.
European Search Report dated Apr. 23, 2003.

* cited by examiner

*Primary Examiner*—Crystal J. Barnes
(74) *Attorney, Agent, or Firm*—Michael D. Smith

(57) ABSTRACT

A method for synchronizing data utilized in a redundant, closed-loop feedback control system is disclosed. In an exemplary embodiment, the method includes configuring a plurality of control nodes within the control system, with each of the plurality of control nodes transmitting and receiving data through a common communication bus. At each of the plurality of control nodes during a given control loop time T=N, the receipt of externally generated data with respect to each control node is verified, the externally generated data having been generated during a preceding control loop time T=N−1. At each of the plurality of control nodes during the given control loop time T=N, output control data is calculated using the externally generated data. During the given control loop time T=N, the calculated output control data from each individual control node is further transmitted over the communication bus to be later utilized by other control nodes during a subsequent control loop time T=N+1.

32 Claims, 4 Drawing Sheets

METHOD FOR SYNCHRONIZING DATA UTILIZED IN REDUNDANT, CLOSED LOOP CONTROL SYSTEMS

BACKGROUND

The present disclosure relates generally to vehicle chassis control systems and, more particularly, to a method for synchronizing data utilized by redundant, closed-loop feedback control systems implemented in distributed vehicle chassis systems.

Chassis control systems such as, for example, electronically controlled brakes and steering, typically rely on feedback control methods to provide desired system performance and stability. Such systems utilize input sensors and feedback sensors to accomplish the feedback control, and are generally locally implemented within an individual electronic control unit (ECU). In this configuration, the sensors and associated computer signals are locally available at the ECU to perform the closed loop control. FIG. 1 is a block diagram illustrating an example of the general structure of a closed loop control system, which further includes a feedforward input coupled to the basic feedback structure. The diagram in FIG. 1 represents the most general, high-level description of a feedback/feedforward control system commonly implemented in automotive control systems.

Traditionally, these control systems have been included in vehicle architecture designs that are centralized in nature (i.e., designs that may be characterized as modular or self-contained). However, a growing motivation in the industry is to provide a distributed control architecture in which various control functions are distributed across multiple ECU's. In so doing, the level of vehicle subsystem integration is increased in an effort to reduce overall electrical system cost, improve packaging, reduce mass, increase availability, etc.

With certain vehicle systems, such as steer-by-wire and brake-by-wire, redundant control systems may be utilized to achieve a desired level of system fault tolerance. For example, multiple actuators, sensors and ECU's may be incorporated into the system to allow for continued operation of the brakes and/or steering in the event of a failure of some of the system components. Certain difficulties exist, however, in attempting to operate a redundant, closed loop feedback system in both a parallel and synchronous manner within the framework of a distributed control architecture.

SUMMARY

The above discussed and other drawbacks and deficiencies of the prior art are overcome or alleviated by a method for synchronizing data utilized in a redundant, closed-loop feedback control system. In an exemplary embodiment, the method includes configuring a plurality of control nodes within the control system, with each of the plurality of control nodes transmitting and receiving data through a common communication bus. At each of the plurality of control nodes during a given control loop time T=N, the receipt of externally generated data with respect to each control node is verified, the externally generated data having been generated during a preceding control loop time T=N−1. At each of the plurality of control nodes during the given control loop time T=N, output control data is calculated using the externally generated data. During the given control loop time T=N, the calculated output control data from each individual control node is further transmitted over the communication bus to be later utilized by other control nodes during a subsequent control loop time T=N+1.

In a preferred embodiment, at each of the plurality of control nodes during the given control loop time T=N, reference input data is calculated using the externally generated data received during the preceding control loop time T=N−1. In addition, at each of the plurality of control nodes during the given control loop time T=N, local sensor inputs are acquired and transmitted through the communication bus to be used by other control nodes during the subsequent control loop time T=N+1. The local sensor inputs acquired at each of the plurality of control nodes during the given control loop time T=N are further used in calculating output control data during the subsequent control loop time T=N+1.

BRIEF DESCRIPTION OF THE DRAWINGS

Referring to the exemplary drawings wherein like elements are numbered alike in the several Figures.

DETAILED DESCRIPTION

Figure 1:
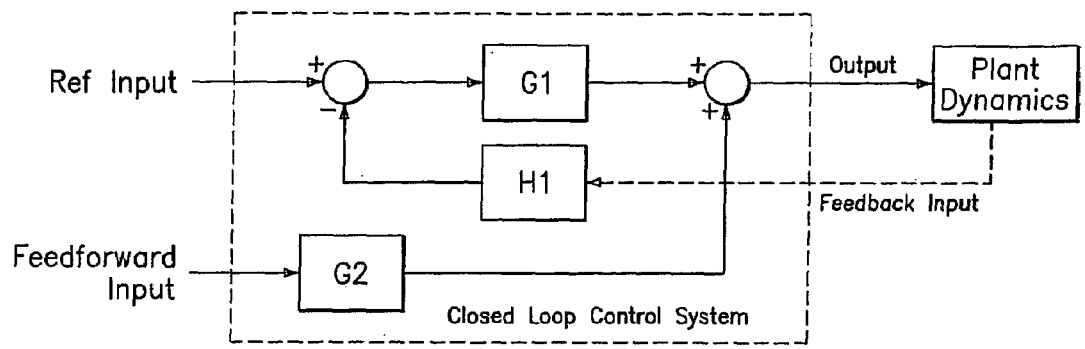
FIG. 1 is a block diagram illustrating an example of the general structure of a closed loop control system, which further includes a feedforward input coupled to the basic feedback structure.
Figure 2:
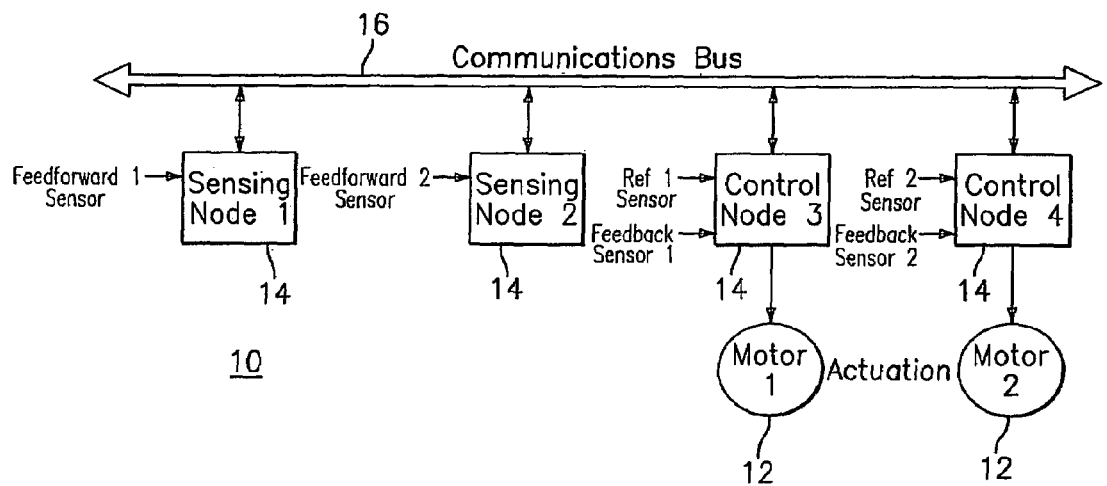
FIG. 2 is a schematic diagram illustrating an example of a redundant electromechanical feedback control system configured within a distributed electrical architecture.

Referring initially to FIG. 2, there is shown a schematic diagram illustrating an example of a redundant electromechanical feedback system 10 configured within a distributed electrical architecture. In such a parallel-operated redundant system 10, both control actuators 12 (i.e., motor 1 and motor 2) are intended to be activated and operated simultaneously. The combination of both actuator outputs therefore provides a net control action.

The exemplary system architecture includes certain desired node characteristics, wherein the "nodes" are embodied as electronic control units (ECU's) 14 that perform a certain function or functions, and are interconnected through a data communication bus 16. For example, there is shown a redundant sensor distribution embodied throughout nodes 1–4, as well as a redundant actuator command distribution embodied within motor 1 and motor 2. Specifically, control nodes 3 and 4 are intended to provide simultaneous actuator (i.e., motor) control (both magnitude and time synchronized), while all of the nodes (sensing nodes 1 and 2, and control nodes 3 and 4) are further intended to provide fail silent behavior. Thus, each node (ECU 14) should both perform its intended function and provide data to the communication bus 16. If it determined that an ECU 14 cannot perform its intended function(s), the output thereof should be disabled and/or the conditioned sensor signals provided to the communication bus 16 should be ceased.

Whenever dual feedback systems are operated in parallel, any performance variability between the two subsystems should preferably be minimized, since the performance variability from one subsystem could be interpreted as a disturbance by its counterpart subsystem. Otherwise, undesirable overall system performance may result. One source of performance variability between the individual subsystems can be system latency and noise, contributed by the use of control signal and sensors used by the feedback control.

Figure 3:
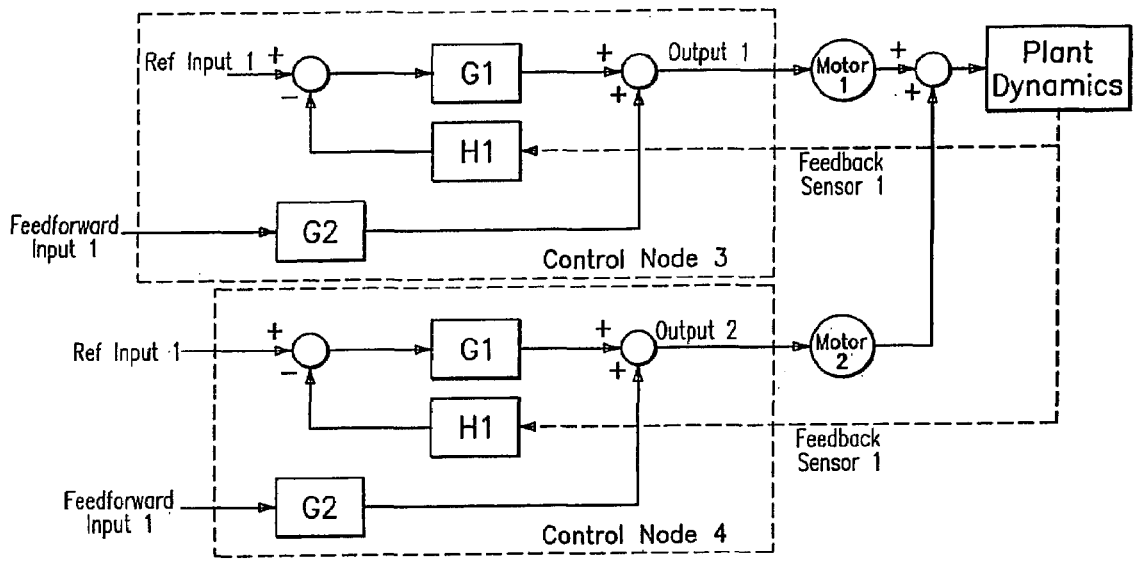
FIG. 3 is a block diagram of the redundant feedback control system of FIG. 2, shown in operation with a primary set of input and feedforward sensors.

A chassis control system architected to operate as a distributed system will utilize a data communications bus to facilitate the exchange of system data, commands, and status or health among the various ECU nodes. In order to provide the desired minimization of performance variations, while also maintaining system availability in the presence of faults, the system should synchronize the use of a set of common calculated commands, sensors and status data. The calculated and sensed data should then be synchronized in both magnitude and time. Thus, a distributed system for an automotive vehicle that implements redundancy principles to satisfy overall system fault tolerance faces the challenge of composing the sensor and actuators in such a way as to satisfy system power efficiency, immunity to electrical noise, and physical packaging. Various examples of possible redundant control system operating configurations are presented in FIGS. 3–5. FIG. 3 is a block diagram of the dual, redundant control system 10 of FIG. 2, wherein the actual control is implemented using primary set of input and feedforward sensors (i.e., Ref Input 1, Feedforward Input 1), as well as a primary feedback sensor (Feedback Sensor 1). The signals on Ref Input 1 and Feedback Sensor 1 are internal to control node 3, but are also provided to control node 4 through communication bus 16. However, the signal on Feedforward Input 1 is provided to both control nodes 3 & 4 by sensing node 1 through communication bus 16.

Figure 4:
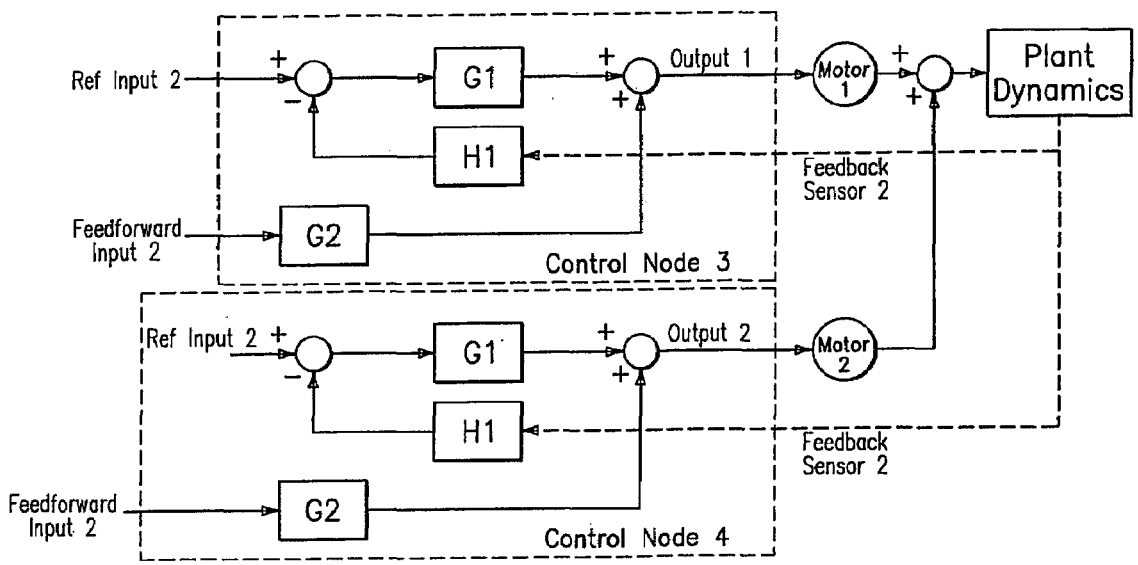
FIG. 4 is a block diagram of the redundant feedback control system of FIG. 2, shown in operation with a secondary (backup) set of input and feedforward sensors.

In FIG. 4, the redundant control system 10 is shown operating with a secondary set of input and feedforward sensors (i.e., Ref Input 2, Feedforward Sensor 2), as well as a secondary feedback sensor (Feedback Sensor 2). In this configuration, the signals on Ref Input 2 and Feedback Sensor 2 are internal to control node 4 and are further provided to control node 3 via communication bus 16. The signal on Feedforward Input 2 is provided to both control nodes 3 & 4, by sensing node 2, via communication bus 16.

Figure 5:
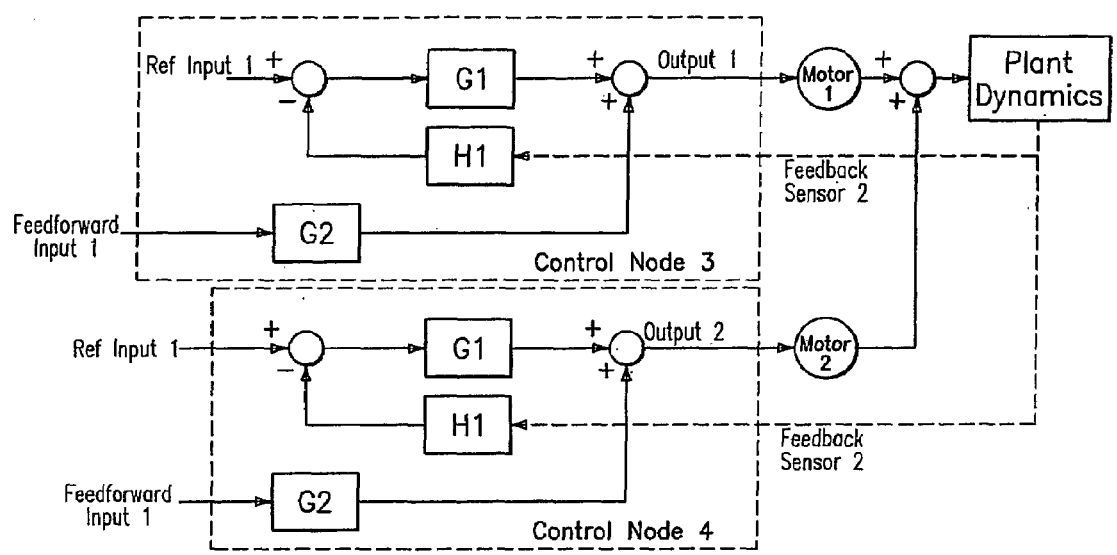
FIG. 5 is a block diagram of the redundant feedback control system of FIG. 2, shown operating with a hybrid (both primary and backup) combination of input and feedforward sensors.

Finally, FIG. 5 illustrates the redundant control system 10 operating in a hybrid configuration, utilizing a combination of primary and secondary sensor inputs, due to a condition such as (for example) the detection of a failed primary feedback sensor (Feedback Sensor 1). Thus configured, the system 10 uses the primary reference and feedforward inputs, while also using the secondary or backup feedback input.

As described earlier and illustrated in FIG. 2, a given control system may dictate that certain nodes be dedicated for sensor acquisition, while others are dedicated to actuator or motor control. Accordingly, a method is needed such that the sensor data and system status from the sensing nodes are made available to the actuator nodes, while also providing minimal system latency. Additionally, such a method should also provide for the condition that each parallel redundant actuator node performing feedback control utilize common data.

Figure 6:
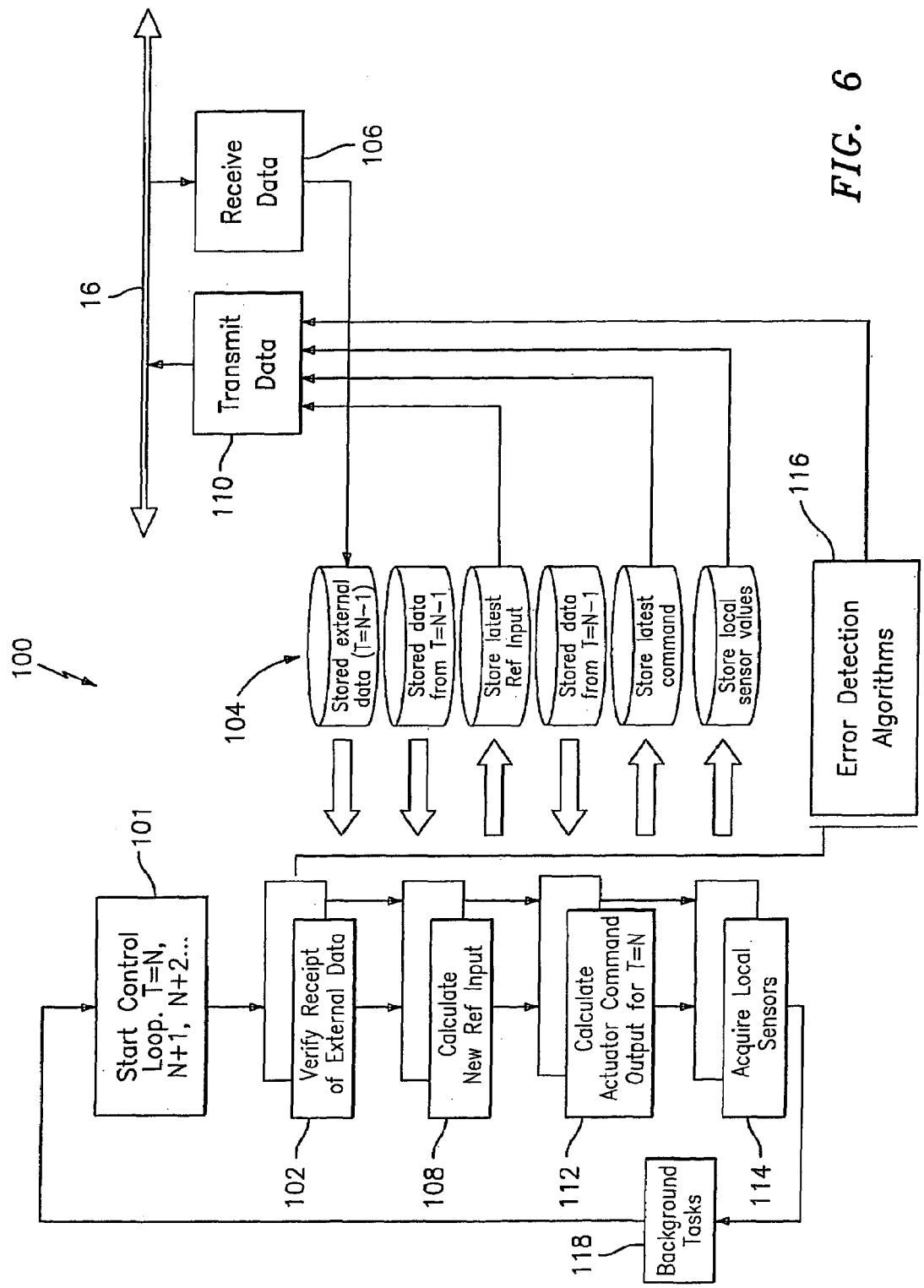
FIG. 6 is an algorithm flow diagram illustrating a method of a synchronizing system data to be utilized across a network of electronic control units, in accordance with and embodiment of the invention.

Therefore, in accordance with an embodiment of the invention, there is disclosed a method for synchronizing system data across a network of ECU nodes, such that each feedback subsystem will have access to and use the same reference control inputs and feedback sensors, even in the presence of a detected system fault(s). The method 100 for synchronizing system data across the network of ECU nodes is illustrated, in one embodiment, by the algorithm flow diagram shown in FIG. 6. It will be noted that the steps outlined therein are preferably implemented at each ECU node in the system. Furthermore, method 100 is implemented within the framework of a control loop beginning at a time T=N, and progressing through sample times N+1, N+2, . . . etc., as shown in block 101.

Proceeding to block 102, method 100 verifies the receipt of external calculation data at each control node, generated from other participating system nodes (via communication bus 16). All external data directly accessible by a particular control node will have been acquired and stored in a storage medium 104 (e.g., a random access memory) at time T=N−1 (i.e., the previous control sample time). For example, in order to ultimately compute output 1, control node 3 will use the data from one of the two external feedforward sensors (Feedforward Sensor 1 or Feedforward Sensor 2), depending upon the particular system configuration. Because this feedforward data is transferred and received over the communication bus 16 (as indicated by block 106) during the previous control loop, the data is already stored in storage medium 104 and ready to be verified during the next control loop. Therefore, at block 102, each node verifies the receipt of all stored data that originated externally with respect to that particular node.

Proceeding to block 108, method 100 then directs the control nodes to calculate updated input reference commands (Ref Input 1 and Ref Input 2) to be used in calculating the feedback control output commands during the next control sample T=N+1. As can be seen, the updated Ref Input 1 and Ref Input 2 are calculated using data stored during T=N−1. Once calculated, the updated input reference commands are both stored in memory 104 and transmitted to other nodes through data communication bus 16, as shown at block 110.

Next, at block 112, the output actuator command for time T=N is calculated at each control node, using externally received data, stored sensor data and input reference commands from time T=N−1. It will be noted that in calculating the output actuator commands, one of the input reference commands will be used. However, as stated previously, the input reference command so used is the not the one just calculated in block 108 for T=N, but the one previously calculated in block 108 for T=N−1. As is the case with the newly calculated reference input, the new command actuator outputs are also stored in memory and transmitted over communication bus 16. Method 100 thereafter proceeds to block 114, where data from sensors locally connected to each node is acquired and conditioned for time T=N. This locally acquired sensor data is then stored for use by other nodes in the next control loop T=N+1.

It will further be noted that method 100 also provides for execution of error detection algorithms concurrently with each of the above described steps for a given control loop, as schematically depicted by block 116 and the shaded blocks behind blocks 102, 108, 112 and 114. The error detection algorithms 116 are preferably designed to isolate any faults specific to a particular functional task to be performed. More specifically, algorithms 116 use externally received data from other ECU nodes (the data also including system health status), as well as local sensor and input command calculations to determine the configuration of control inputs, feedback sensors, and output actuator commands to be used by each node in future control loops. Thus, locally acquired sensing inputs, calculated commands, diagnosis of the local variables, and the current local ECU "health" are all provided to the communication bus 16 for transmission to the other ECU's in the system 10.

The selection of sensor configurations for the closed loop control under the presence of system errors is determined based on an "a priori" design of the decision tree (or logic) pre-programmed at each node. Switching from one signal configuration to an alternate desired configuration is performed once global confirmation is received by the system nodes. The proper operation of the error detection algorithms at each node will allow the redundant system 10 to dynamically configure its control to allow for a variety of input and output configurations, as the examples of FIGS. 3–5 illustrate.

Moreover, the error detection algorithms 116 provide that all system nodes are coordinated at each successive control loop to have the desired configuration of inputs, feedback sensors, and output commands. By way of example, some specific tasks that may be executed by the error detection algorithms 116 include, but are not limited to: performing local sensor diagnosis (e.g., determining a valid range, rate of change, etc.); performing sensor comparison checks with other local and externally received signals (via communication bus 16); determining future sensor and command signal control loop configurations using voting logic, or other known diagnostic methods; updating local system health status information; and determining a desired actuator output condition (e.g., fail silent: yes/no).

Finally, at block 118, method 100 also allows for the execution of various background ECU tasks, such as parity checking or other related microprocessing functions, prior to the next control process interrupt. Thereafter, method 100 returns to block 101 to repeat the above described steps after a process interrupt occurs.

It is to be understood that the method 100 embodied and described herein is further capable of performing synchronization functions for ECU's utilized in systems of greater than double redundancy. That is to say, the principles of method 100 may be further expanded and scaled to systems having an even greater number of sensor and actuator nodes. Through the use of the above described method, several advantages are realized. First, the maximum system latency to transmit updated output commands to the actuator(s) is two control loop samples, which latency is further independent of the number of system control ECU's or input/feedback sensors utilized. Second, the extent of any performance variation between actuator subsystems is reduced to only those variations related to the actual physical plant dynamics of the actuator devices under closed loop control. Third, a generated control command is calculated based on the same input and feedback sensors. Thus, the servo control loops will benefit from improved coordinated performance. This is especially the case where the sensors are susceptible to external noise, as is common with many analog-conditioned sensors.

In addition, the disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method for synchronizing data utilized in a redundant, closed-loop feedback control system, the method comprising:
   configuring a plurality of control nodes within the control system, each of said plurality of control nodes transmitting and receiving data through a common communication bus;
   at each of said plurality of control nodes, during a given control loop time T=N, verifying the receipt of externally generated data with respect to each control node, said externally generated data having been generated during a preceding control loop time T=N−1; and
   at each of said plurality of control nodes, during said given control loop time T=N, calculating output control data using said externally generated data;
   wherein, during said given control loop time T=N, said calculated output control data from each individual control node is further transmitted over said communication bus to be later utilized by other control nodes coupled to said communication bus during a subsequent control loop time T=N+1.

2. The method of claim 1, further comprising:
   at each of said plurality of control nodes, during said given control loop time T=N, calculating reference input data using said externally generated data received during said preceding control loop time T=N−1.

3. The method of claim 2, further comprising:
   at each of said plurality of control nodes, during said given control loop time T=N, acquiring local sensor inputs, said local sensor inputs further being transmitted through said communication bus to be used by other control nodes during said subsequent control loop time T=N+1.

4. The method of claim 3, wherein:
   said local sensor inputs acquired at each of said plurality of control nodes during said given control loop time T=N are further used in calculating output control data during said subsequent control loop time T=N+1.

5. The method of claim 4, further comprising:
configuring a plurality of sensing nodes within the control system, each of said plurality of sensing nodes transmitting and receiving data through said common communication bus;
wherein, said externally generated data with respect to each control node includes outputs from said plurality of sensing nodes.

6. The method of claim 5, wherein:
said outputs from said plurality of sensing nodes include feedforward signals.

7. The method of claim 6, wherein:
said local sensor inputs acquired at each of said plurality of control nodes include feedback signals.

8. The method of claim 7, wherein:
said local sensor inputs acquired at each of said plurality of control nodes further include reference input signals.

9. The method of claim 8, wherein:
said feedforward signals include a primary feedforward signal and a secondary feedforward signal;
said feedback signals include a primary feedback signal and a secondary feedback signal;
said reference input signals include a primary reference input signal and a secondary reference input signal; and
during said given control loop time T=N, said plurality of control nodes utilize one of said primary and secondary feedforward signals, one of said primary and secondary feedback signals, and one of said primary and secondary reference input signals.

10. The method of claim 1, further comprising:
during said given control loop time T=N, running an error detection algorithm for each of said plurality of control nodes, said error detection algorithm determining a diagnostic operating status for each of said plurality of control nodes;
wherein, based upon the determined diagnostic operating status for each of said plurality of control nodes, said error detection algorithm further determines an operating configuration of feedforward, feedback and reference input signals for each of said plurality of control nodes.

11. A method for synchronizing data utilized in a redundant, closed-loop feedback control system, the method comprising:
configuring a first control node to control a first actuator, said first actuator producing a first actuator output;
configuring a second control node to control a second actuator, said second actuator producing a second actuator output, said first and second actuator outputs further being combined to control a plant;
configuring a communication bus for transmitting data signals to and from said first and second control nodes;
at both of said first and second control nodes, during a given control loop time T=N, verifying the receipt of externally generated data with respect to each of said first and second control nodes, said externally generated data having been generated during a preceding control loop time T=N−1; and
at both of said first and second control nodes, during said given control loop time T=N, calculating output control data using said externally generated data;
wherein, during said given control loop time T=N, said calculated output control data from said first and second control nodes is further transmitted over said communication bus to be utilized during a subsequent control loop time T=N+1.

12. The method of claim 11, wherein:
at said first control node, said output control data further comprises a first actuator output command; and
at said second control node, said output control data further comprises a second actuator output command.

13. The method of claim 12, further comprising:
configuring a first sensing node to receive a first feedforward sensor input, said first sensing node coupled to said communication bus; and
configuring a second sensing node to receive a second feedforward sensor input, said second sensing node coupled to said communication bus;
wherein said first and said second feedforward sensor inputs are included in said externally generated data with respect to said first and second control nodes.

14. The method of claim 13, further comprising:
at said first control node during said given control loop time T=N, calculating a first reference input from data externally generated with respect to said first control node during said preceding control loop time T=N−1;
at said second control node during said given control loop time T=N, calculating a second reference input from data externally generated with respect to said second control node during said preceding control loop time T=N−1;
wherein said calculated first and second reference inputs during T=N are transmitted over said communication bus, so as to be accessible during said subsequent control loop time T=N+1.

15. The method of claim 14, further comprising:
at said first control node during said given control loop time T=N, acquiring and storing a first feedback sensor input; and
at said second control node during said given control loop time T=N, acquiring and storing a second feedback sensor input;
wherein said acquired and stored first and second reference feedback sensor inputs during T=N are transmitted over said communication bus, so as to be accessible during said subsequent control loop time T=N+1.

16. The method of claim 15, further comprising:
during said given control loop time T=N, running an error detection algorithm for said first and second control nodes and for said first and second sensing nodes, said error detection algorithm determining a diagnostic operating status for each of said first and second control nodes and said first and second sensing nodes;
wherein, based upon the determined diagnostic operating status for each of said first and second control nodes and said first and second sensing nodes, said error detection algorithm further determines an operating configuration of feedforward, feedback and reference input signals for said first and second control nodes during said subsequent control loop time T=N+1.

17. The method of claim 16, wherein during said given control loop time T=N:
said first and said second control nodes use a common reference input signal in producing said first actuator output and said second actuator output, respectively, said common reference input signal being chosen by said error detection algorithm from one of said first input reference signal and said second input reference signal;
said first and said second control nodes further use a common feedforward signal in producing said first actuator output and said second actuator output, respectively, said common feedforward signal being chosen by said error detection algorithm from one of said first feedforward signal and said second feedforward signal; and said first and said second control nodes further use a common feedback signal in producing said first actuator output and said second actuator output, respectively, said common feedback signal being chosen by said error detection algorithm from one of said first feedback signal and said second feedback signal.

18. The method of claim 17, wherein:
said error detection algorithm may select said common reference input signal independently from said common feedforward signal and said common feedback signal.

19. The method of claim 17, wherein:
said error detection algorithm may select said common feedforward signal independently from said common reference input signal and said common feedback signal.

20. The method of claim 17, wherein:
said error detection algorithm may select said common feedback signal independently from said common feedforward signal and said common reference input signal.

21. A redundant, closed loop feedback control system, comprising:
a first control node coupled to a first actuator, said first actuator producing a first actuator output;
a second control node coupled to a second actuator, said second actuator producing a second actuator output, said first and second actuator outputs further being combined to control a plant;
a communication bus for transmitting data signals to and from said first and second control nodes;
said first control node receiving a primary reference input signal and a primary feedback signal, said primary reference input signal and said primary feedback signal being generated locally with respect to said first control node, said second control node also receiving, through said communication bus, both said primary reference input and said primary feedback signal;
said second control node receiving a secondary reference input signal and a secondary feedback signal, said secondary reference input signal and said secondary feedback signal being generated locally with respect to said second control node, said first control node also receiving, through said communication bus, both said secondary reference input and said secondary feedback signal; and
means for synchronizing, within a given control loop time T=N, a selected set of reference input signals and feedback signals to be used in producing said first and second actuator outputs;
wherein said selected set of reference input signals and feedback signals used in producing said first and second actuator outputs are generated during a previous control loop T=N−1.

22. The system of claim 21, further comprising:
a first sensing node for receiving a primary feedforward input, said first sensing node coupled to said communication bus; and
a second sensing node for receiving a secondary feedforward input, said second sensing node coupled to said communication bus;
wherein said first and second control nodes are capable of receiving said primary and secondary feedforward inputs through said communication bus.

23. The system of claim 22, further comprising:
an error detection algorithm, implemented during said given control loop T=N, said error detection algorithm for determining a diagnostic operating status for each of said first and second control nodes and said first and second sensing nodes;
wherein, based upon the determined diagnostic operating status for each of said first and second control nodes and said first and second sensing nodes, said error detection algorithm further determines an operating configuration of feedforward, feedback and reference input signals for said first and second control nodes during said subsequent control loop time T=N+1.

24. The system of claim 23, wherein during said given control loop time T=N:
said first and said second control nodes use a common reference input signal in producing said first actuator output and said second actuator output, respectively, said common reference input signal being chosen by said error detection algorithm from one of said first input reference signal and said second input reference signal;
said first and said second control nodes further use a common feedforward signal in producing said first actuator output and said second actuator output, respectively, said common feedforward signal being chosen by said error detection algorithm from one of said first feedforward signal and said second feedforward signal; and
said first and said second control nodes further use a common feedback signal in producing said first actuator output and said second actuator output, respectively, said common feedback signal being chosen by said error detection algorithm from one of said first feedback signal and said second feedback signal.

25. The system of claim 24, wherein:
said error detection algorithm may select said common reference input signal independently from said common feedforward signal and said common feedback signal.

26. The system of claim 24, wherein:
said error detection algorithm may select said common feedforward signal independently from said common reference input signal and said common feedback signal.

27. The system of claim 24, wherein:
said error detection algorithm may select said common feedback signal independently from said common feedforward signal and said common reference input signal.

28. A storage medium, comprising:
a machine readable computer program code for synchronizing data utilized in a redundant, closed-loop feedback control system; and
instructions for causing a computer to implement a method, the method further comprising:
during a given control loop time T=N, verifying the receipt of externally generated data with respect to each of a plurality of control nodes configured within the control system, said externally generated data having been generated during a preceding control loop time T=N−1; and
at each of said plurality of control nodes, during said given control loop time T=N, calculating output control data using said externally generated data;
wherein, during said given control loop time T=N, said calculated output control data from each individual control node is further transmitted over a common communication bus to be later utilized by other control nodes coupled to said communication bus during a subsequent control loop time T=N+1.

29. The storage medium of claim 28, further comprising:
at each of said plurality of control nodes, during said given control loop time T=N, calculating reference input data using said externally generated data received during said preceding control loop time T=N−1.

30. The storage medium of claim 29, further comprising:
at each of said plurality of control nodes, during said given control loop time T=N, acquiring local sensor inputs, said local sensor inputs further being transmitted through said communication bus to be used by other control nodes during said subsequent control loop time T=N+1.

31. The storage medium of claim 30, wherein:
said local sensor inputs acquired at each of said plurality of control nodes during said given control loop time T=N are further used in calculating output control data during said subsequent control loop time T=N+1.

32. The storage medium of claim 31, further comprising:
configuring a plurality of sensing nodes within the control system, each of said plurality of sensing nodes transmitting and receiving data through said common communication bus;
wherein, said externally generated data with respect to each control node includes outputs from said plurality of sensing nodes.

* * * * *

UNITED STATES PATENT AND TRADEMARK OFFICE
CERTIFICATE OF CORRECTION

PATENT NO. : 7,181,644 B2  
APPLICATION NO. : 10/043930  
DATED : February 20, 2007  
INVENTOR(S) : Scott A. Millsap et al.

Page 1 of 1

It is certified that error appears in the above-identified patent and that said Letters Patent is hereby corrected as shown below:

Title Page:

(75) Inventors, delete "Joseph G. A'Dmbrosio" and insert therefor
--Joseph G. D'Ambrosio--

Signed and Sealed this

Eighth Day of April, 2008

JON W. DUDAS  
*Director of the United States Patent and Trademark Office*